Dec. 16, 1924.  
J. W. FUGE  
1,519,827  
MEASURING MEANS FOR USE IN MILKING MACHINE INSTALLATIONS  
Filed Nov. 5, 1923
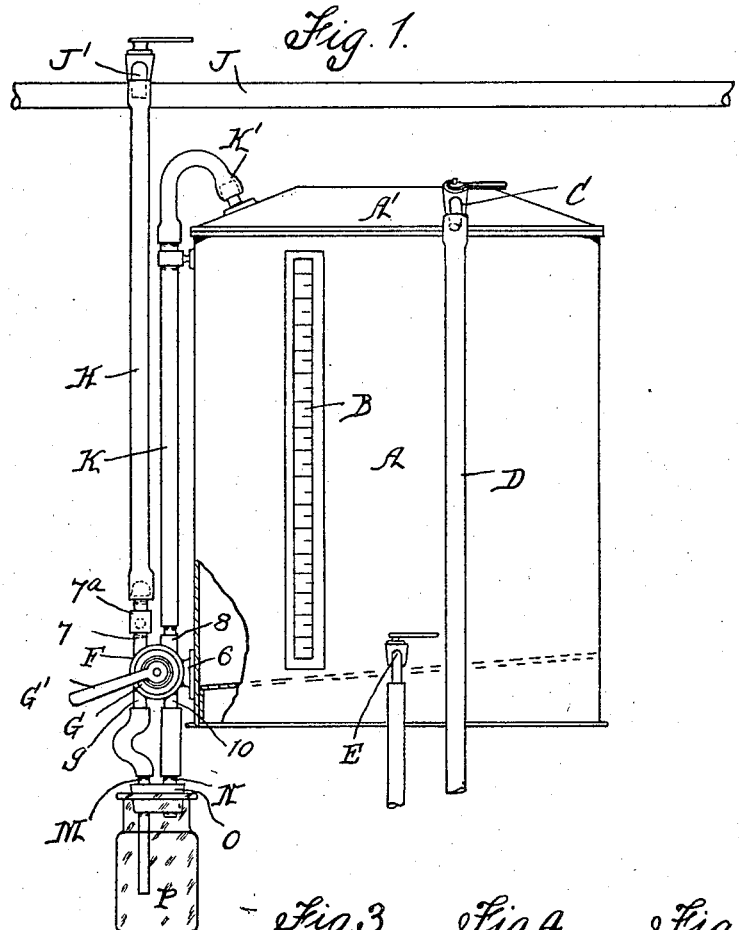
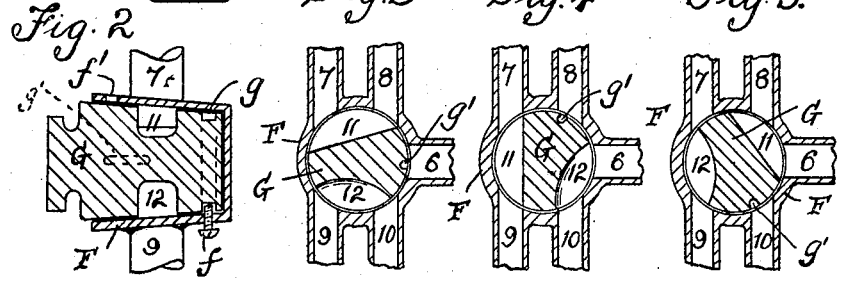
Inventor:  
James Wilfred Fuge  
By _____ Attorney Patented Dec. 16, 1924.

1,519,827

UNITED STATES PATENT OFFICE.

JAMES WILFRED FUGE, OF FEATHERSTON, NEW ZEALAND, ASSIGNOR TO THE FUGE NEW WAY MILKING MACHINE AND TESTER COMPANY LIMITED, OF FEATHERSTON, NEW ZEALAND.

MEASURING MEANS FOR USE IN MILKING-MACHINE INSTALLATIONS.

Application filed November 5, 1923. Serial No. 672,946.

*To all whom it may concern:*

Be it known that I, JAMES WILFRED FUGE, subject of the King of Great Britain, residing at Kahautara Road, Featherston, in the Dominion of New Zealand, have invented new and useful Improvements in Measuring Means for Use in Milking-Machine Installations, of which the following is a specification.

This invention relates to the well known class of devices used with milking machine installations for the purpose of measuring the milk given by each cow, in which an airtight measuring vessel is interposed within the vacuum-releaser main of the installation and the teat cups at each milking point, so that the milk as it is drawn from the cow is received in such vessel and held therein until its quantity is ascertained, and is then drawn away to the releaser main to be released in the usual way, into open cans or other receptacles.

The invention consists in a special construction and arrangement of devices combined with such a receiving vessel, whereby the operations of connecting the vessel with the vacuum main, to receive the milk, and with such main, to draw the milk away therefrom, are carried out through the agency of a valve of simple construction and easy operation; and whereby moreover, if so desired, a testing sample may be separated and retained as the milk passes away from the measuring vessel.

These devices are illustrated in the accompanying drawings and will be hereinafter fully described in relation thereto. In such drawings:—

Figure 1 is a general elevation of the whole apparatus as set up in working position.

Figure 2 is an enlarged longitudinal sectional view of the control valve.

Figures 3, 4 and 5 are cross sectional views thereof, showing the valve in the three respective positions to which it may be shifted in the working of the apparatus.

In carrying out the invention a measuring air tight vessel A is provided, such vessel having a removable lid A' to facilitate its cleaning and preferably having a sloping bottom leading to one side. The vessel is fitted with a sight gauge glass B to allow of its contents being measured and, at its top, with a valve controlled nipple C on to which the usual flexible tube D leading to the teat cups is connected. It is also provided at its bottom with a valve nipple E to enable the milk obtained by hand stripping the cow to be added to that drawn into the vessel by the machine milking. These features are common to a number of appliances of this nature already in existence and need no further description or explanation of their respective fuctions.

In this invention a valve of special form is secured to the side of the vessel A at a position approximating to the lowest level of its sloping bottom. This valve is of the rotating plug type and it is formed with a casing F of internal tapering diameter and a tapered plug G fitted closely therein and having a handle G' for turning it. The plug may be secured in the casing in any suitable manner, as for instance by forming it with a groove $g$ in the inner end of its periphery and passing a small set screw $f$ through the casing so that its end enters the groove, as shown in Figure 2. The inner edge of the plug at a point in its diameter may be broken away for a short distance so as to allow of the plug being withdrawn for cleansing purposes, and replaced, by turning it to bring such break into coincidence with the position of the set screw.

The casing F is arranged to extend at a tangent to the vessel A and is connected to the inside bottom thereof through a branch 6 entering the vessel's side. The casing on its upper side is formed with two side by side upwardly extending branches 7 and 8, and on its lower side, with the two side by side downwardly extending branches 9 and 10. All these branches open into the inside of the casing in the same peripheral line. The branch 7 is fitted with a non-return valve 7ª of any usual type such as to permit of fluid flow away from the valve but to prevent back flow. It is then connected by an ordinary rubber pipe H with the ordinary vacuum-releaser main J of the installation, through a valve controlled branch J' of well known form.

The branch 8 is connected to the top of the vessel A by a pipe K extending up therefrom for the height of the vessel, and then by a rubber tube connection K'. This pipe K may, in some cases, if so desired, be made of glass and serve as the measuring gauge of the vessel in a manner to be hereinafter explained.

The branches 9 and 10 are respectively connected to tubes M and N that pass downwards through a plug cork O of a sample receiving bottle P, the tube N entering to just below the cork while the tube M extends right down into the bottle and is capable of having its position or level adjusted therein.

The valve plug G is formed with a groove 11 extending tengentially in its periphery on one side of its centre, and on its other side with a similar groove 12. These grooves are arranged in the same peripheral line as each other, and also coincide in position with the line of the branches 6 to 10 in the casing F. The groove 11 is made of such a depth and length that it is capable of connecting together the two branches 7 and 8, or the branches 7 and 9, or the branches 6 and 8 according to the positions to which the plug G may be turned. The groove 12 is made of such a depth and length that it may connect the branches 6 and 10 together. The two grooves are also so disposed relatively to each other that when the plug is turned to the position shown in Figures 2 and 3 to connect the branches 7 and 8 together, through the groove 11, a solid part of the plug closes the branch 6 and when the plug is turned, as shown in Figure 4, to connect the branches 6 and 10 together through the groove 12, the branches 7 and 9 are also connected through the groove 11.

In the operation of the valve, the vessel A is placed in condition to receive the milk from the cow, by turning the valve into the position shown in Figures 2 and 3, and in this position, the top of the can is connected to the main J through the pipe K, the valve, and the pipe H, so that the vessel is exhausted of its air, and milk will flow into it from the teat cups. When the milking has finished and the valve C is closed, the hand strippings are taken and then allowed to be drawn into the vessel through the valve E, while the valve F—G remains in this position. The amount of the milk in then ascertained by an inspection of the gauge glass and the valve F—G is turned to the second position shown in Figure 4. In this position the bottom of the vessel is connected to the main J through the branch 6, groove 12, branch 10 and tube N, the sample bottle P, tube M, branch 9, groove 11, branch 7 and pipe H, so that the milk will be drawn away from the vessel to the main. The whole of the milk will thereby pass through the sample bottle P and a small residue will be left behind in said bottle if the tube M is adjusted to leave a gap between its bottom and the bottom of the bottle. This residue may then be used for testing purposes, the bottle being removed by drawing it from the plug O and a fresh bottle placed thereon ready for the next cow's milking. The bottle need not, however, be removed and the fresh one placed thereon, until the next cow's milking is proceeding, with the valve in the position shown in Figures 2 and 3.

In order to ensure of the milk flowing away from the vessel A to the releaser main in the manner indicated, provision is made in the valve F—G for the admission of a small quantity of air into the top of the vessel, through the branch 8 and its connections, when the valve plug is turned to the position shown in Figure 4. This is effected by forming the casing F with a small air port $f'$ in the line of the branch 8 and by forming the plug G with a short groove $g'$ made in its periphery and so positioned, and made of such a length, that it will bridge the air port $f'$ and the opening into the branch 8 when the plug is turned to the position indicated. This connection will be broken when the plug is in its other positions.

The construction of valve will allow for the tube K being used as a measuring gauge glass to measure the contents of the vessel A, as by turning the plug from the position shown in Figure 3 to the position shown in Figure 5, the branches 6 and 8 are connected through the groove 11, so that the liquid within the vessel may rise in the tube to a corresponding level to that within the vessel. In such a case the tube is made of transparent nature, as glass, and is appropriately graduated.

I claim:—

1. In a vacuum operated liquid measuring and dispensing installation, the combination, with a vacuum main, and an air-tight vessel provided with an inlet pipe for the liquid: of a valve casing, a branch connection leading to said casing from the bottom of said vessel, a pipe connection leading to the vacuum main from the valve casing, a pipe connection leading to said casing from the top of said vessel, and a rotary valve in said casing provided with a pair of separate passages; said passages adapted, in one position of the valve, to bridge the lower ends of the two pipe connections while closing the branch connection, thereby to connect said vessel and its inlet pipe with the vacuum; and, in another position of the valve, to provide communication between said branch connection and the vacuum pipe connection while cutting out communication between said vacuum pipe connection and the pipe connection leading from the vessel top, thereby to withdraw the liquid from the bottom of said vessel and deliver it to the vacuum main.

2. In a vacuum operated liquid measuring and dispensing installation, the combination, with a vacuum main, and an air-tight vessel provided with an inlet pipe for the liquid: of a valve casing, a branch connection leading to said casing from the bottom of said vessel, a pipe connection leading to the vacuum main from the valve casing, a pipe connection leading to said casing from the top of said vessel and including a tubular vertical glass portion constituting a sight gauge, and a rotary valve in said casing provided with a pair of separate passages; said passages adapted, in one position of the valve, to bridge the lower ends of the two pipe connections while closing the branch connection, thereby to connect said vessel and its inlet pipe with the vacuum; in another position of the valve, to provide communication between said branch connection and the vacuum pipe connection while cutting out communication between said vacuum pipe connection and the pipe connection leading from the vessel top, thereby to withdraw the liquid from the bottom of said vessel and deliver it to the vacuum main; and, in a third position of the valve, to provide communication between said branch connection and the said connection leading from the vessel top, thereby to permit the liquid to flow from the bottom of the vessel into the gauge tube.

3. Vacuum operated apparatus, according to claim 1, in which the rotary valve is of the plug type, and its passages are in the form of peripheral grooves; and in which coacting air ports are formed in the valve casing and the periphery of the valve to admit a small quantity of air to pass into the pipe connection leading from the vessel top when the valve is in the second-named position.

In testimony whereof I affix my signature.

JAMES WILFRED FUGE.